United States Patent [19]
Damour

[11] 3,917,187
[45] Nov. 4, 1975

[54] EXPANDING MANDREL OR CHUCK

[76] Inventor: Lawrence R. Damour, 16 Chesler Sq., Succasunna, N.J. 07876

[22] Filed: July 12, 1974

[21] Appl. No.: 488,160

[52] U.S. Cl. ............................................. 242/72 B
[51] Int. Cl. ........................................... B65H 75/18
[58] Field of Search ............ 242/72 B, 72; 279/2, 1; 269/48.1

[56] References Cited
UNITED STATES PATENTS

| | | | |
|---|---|---|---|
| 2,950,071 | 8/1960 | Tidland | 242/72 B |
| 3,006,151 | 10/1961 | Jourdain | 242/72 B |
| 3,414,210 | 12/1968 | Gaudin | 242/72 B |
| 3,825,167 | 7/1974 | Komorek | 242/72 B |

*Primary Examiner*—Edward L. McCarthy
*Attorney, Agent, or Firm*—Ralph R. Roberts

[57] ABSTRACT

This invention pertains to an expanding mandrel or chuck in which air or hydraulic fluid is fed to and into a resilient tube arranged in a helical spiral as shown in my U.S. Pat. No. 3,825,167 as issued on July 23rd, 1974. In such mandrels the tube is carried by and in grooves formed in a body and when pressurized air is fed into the tube it is expanded in a controlled manner to move three or more longitudinally disposed jaws outwardly to positively drive a supported member carried on the chuck. The three embodiments herein disclose a body on which the jaws provide substantiially all the circumferential area. These jaw arrangements increase the jaw area in driving engagement with the core of the supported member. The jaws are preferably made of extruded material which is sufficiently flexible to conform to the inside bore of the core.

8 Claims, 10 Drawing Figures

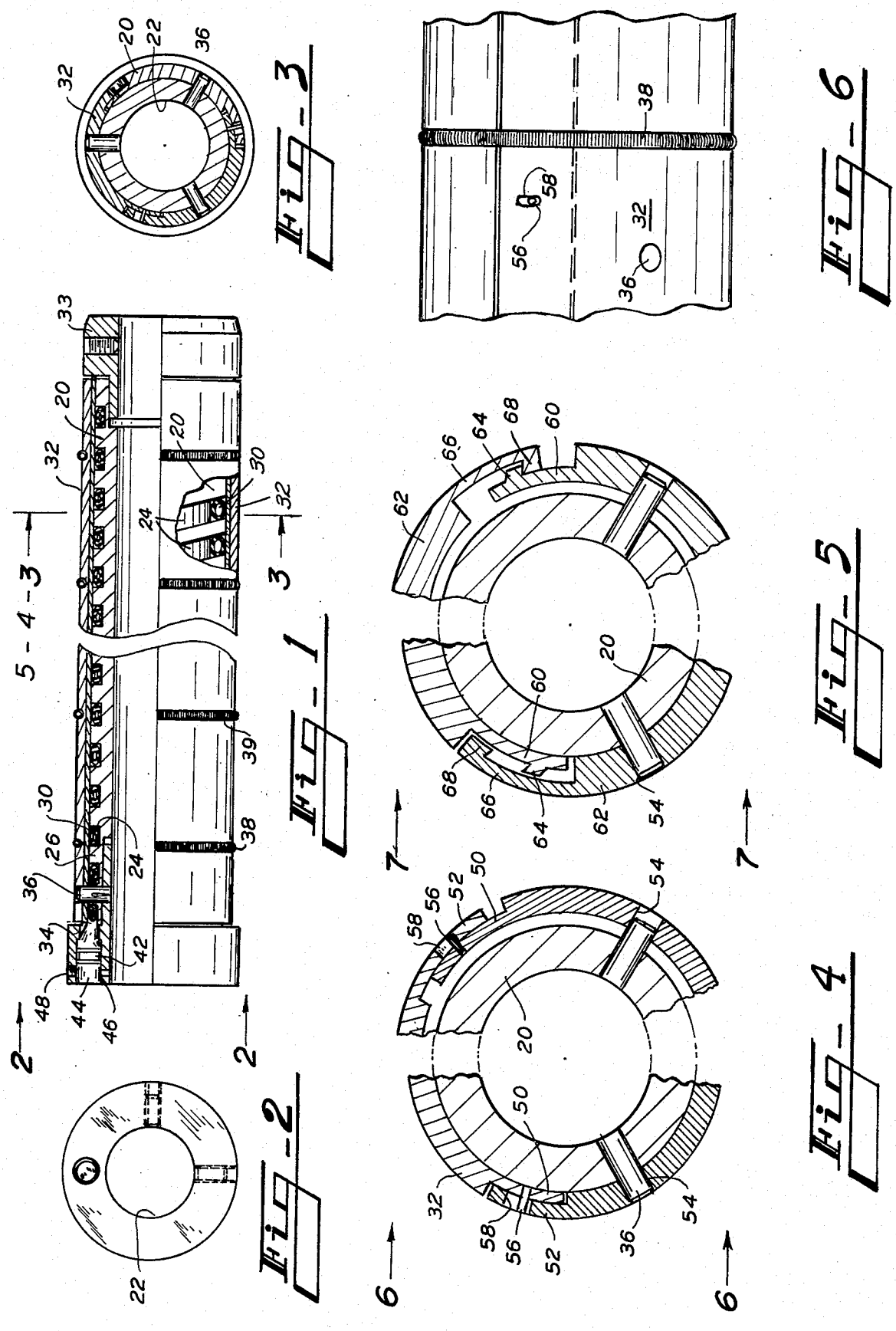

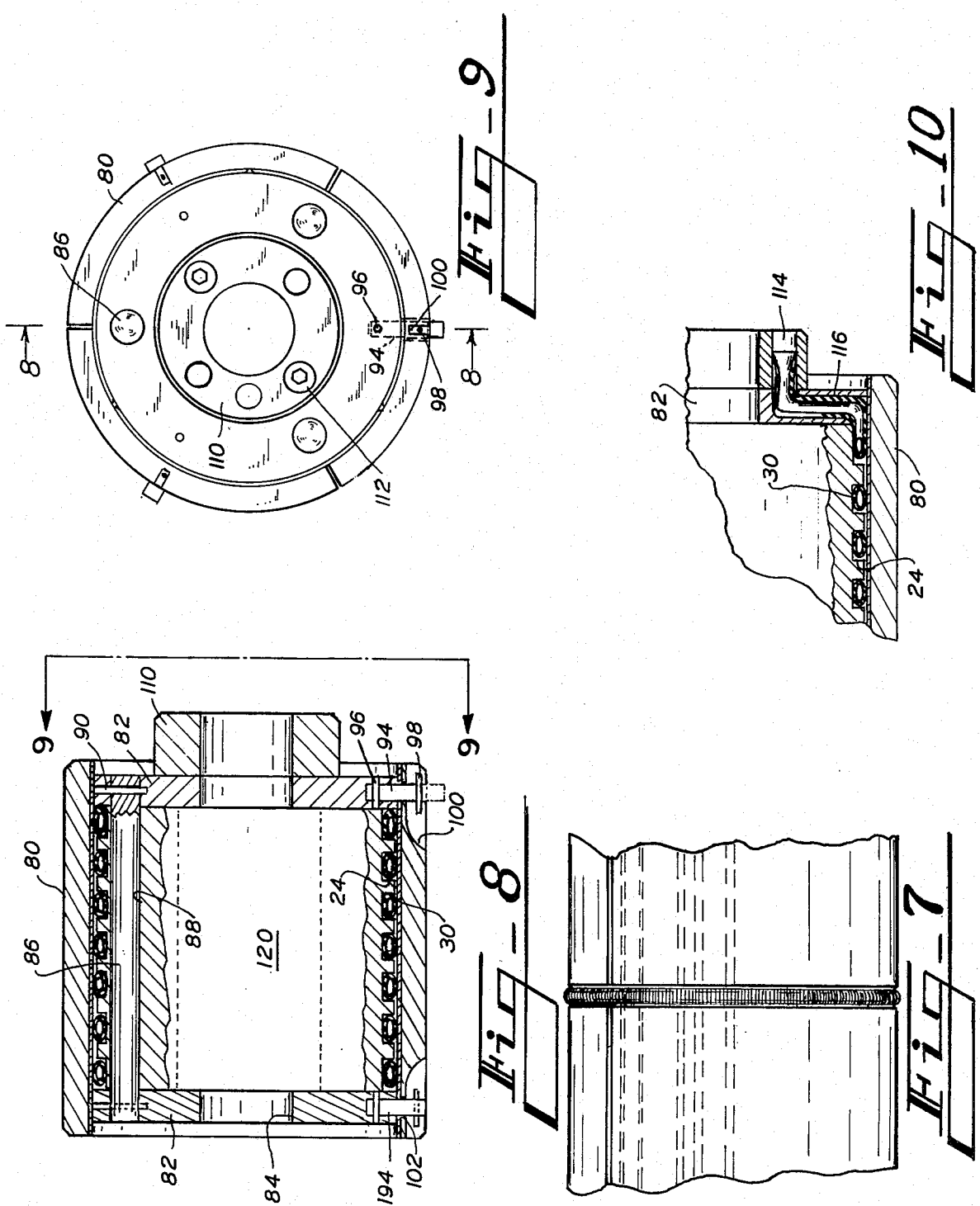

EXPANDING MANDREL OR CHUCK

BACKGROUND OF THE INVENTION

1. Field of the Invention

With reference to the classification of art as established by the U.S. Patent Office this invention pertains to the general class of "Winding and Reeling" (Class 242) and more particularly to the subclass of "supporters and holders" (subclass 68).

2. Description of the Prior Art

Expanding chucks and mandrels, of course, are well known and of particular interest are those using a hydraulic fluid or air to outwardly move segments. However, prior to the mandrels shown in U.S. Pat. No. 3,825,167 and incorporated by reference into this application most of the known expanding mandrels using air or hydraulic fluid in combination with resilient tubes have the resilient tube-like expanding members arranged in a longitudinal manner. These tubes are usually connected to a header system and under pressure move certain jaw members of the mandrel outwardly. Springs or the like are used to cause these expanding portions of the mandrel to be drawn back into seated position when the pressure has been relaxed. These header systems and longitudinal arrangements of the resilient tubes of these prior art chucks are often less than satisfactory since the developed pressures on the several jaws are unequal and leaks in the tubing connections often occur. In the present invention the element which receives the air or hydraulic fluid and becomes pressurized is a single spiralwound tube which is retained in a formed groove so as to be restrained from lateral expansion and blowout. This tube is confined locally against excess expansion and is expansible locally outwardly within established limits by means of three or more movable jaws which are moved under the influence of pressure in the tube.

Expanding mandrel means using spiral-wound resilient tubing is shown in Canadian Pat. No. 654,990 to SCARISBRICK which issued on Jan. 1st, 1963 and Canadian Pat. No. 653,299 which issued to CRESSMAN on Dec. 4th, 1962. In these patents the spiralwound tube is unrestrained except for the outer sheath which is of expansible material such as cloth or a rubberized or resilient material used to restrain a blowout of the tube member which is a rubber tube. In the present invention the retention of the resilient tube is in preformed metal grooves and the amount of expansion locally permitted the tube is very small. The wall thickness of the elastic tube is made sufficient to prevent weakening and blowing out when line air pressure is applied to the tube and the movable jaws which are moved outwardly by the expanding rubber tube expose a very small unconfined restraint of the tube.

It is to be noted that in the Canadian patents, above-identified, that the torque is transmitted from the spiral-wound rubber tube to the shell which it supports and turns. In the present invention the resilient, spiral-wound tube, when pressurized, pushes three metal jaw members outwardly into driving engagement with the core or shell to be driven. These jaws are slidably retained by fixed means secured to the body member so that driving torque is not transmitted to or from the rubber tube.

The present invention permits sectionalizing of the mandrel to drive locally engaged portions of the supported roll or core and also to suit particular conditions including making small drive units of about one inch diameter.

SUMMARY OF THE INVENTION

A metal body has a spiral groove formed in an intermediate portion thereof. A rubber tube is sized to snugly fit in this groove and is closed at one end and is connected to an air inlet source at the other end. Three or more outwardly movable drive jaws are retained against rotative movement and also against torque forces by pins and are retained by limiting means against excessive outward movement. The drive torque is transmitted from the movable jaws to the body without applying torque forces to the tube.

Whether the embodiments are used as rewind shafts in which the drive jaws are made as movable shoes with their exterior surfaces smooth and longitudinal edges rounded or as drive shoes for mandrels is a matter of choice. Stop collars adapted to be removably secured to the body or shoe retaining pins are provided on rewind shafts and these collars have relief portions enabling the movable shoes to be displaced outwardly to engage the inner surface of supported cores. Air may be fed to the helical tube through the central portion of one end of the shaft, if desired.

In addition to the above summary the following disclosure is detailed to insure adequacy and aid in understanding of the invention. This disclosure, however, is not intended to cover each variation in form or additions of further improvements. For this reason there has been chosen specific embodiments of the expanding mandrel or chuck as adopted for use with a helically wound rubber tube used to move jaw members outwardly.

These specific embodiments have been chosen for the purpose of illustration and description as shown in the accompanying drawings wherein:

BRIEF DESCRIPTION OF THE DRAWINGS

FIG. 1 represents a side view of an expanding mandrel of this invention with a portion in section to show the internal construction of the body and a helically wound tubing mounted in a retaining groove in the body;

FIG. 2 represents an end view taken on the line 2—2 of FIG. 1 and showing the inlet support end and the tubing inlet feed;

FIG. 3 represents a sectional view taken on the line 3—3 of FIG. 1 and looking in the direction of the arrows and showing a typical arrangement in which the movable chuck jaws are in a nonexpanded condition;

FIG. 4 represents a diagrammatic sectional view of the mandrel, this view taken on the line 4—4 of FIG. 1 and showing one arrangement of the drive jaws and with the mandrel in both an expanded and nonexpanded condition;

FIG. 5 represents a diagrammatic sectional view of the mandrel in which an alternate arrangement of drive jaws is provided, this view taken on the line 5—5 of FIG. 1 and showing the mandrel in both an expanded and nonexpanded condition;

FIG. 6 represents a fragmentary side view of the mandrel employing the jaw arrangement of FIG. 4;

FIG. 7 represents a fragmentary side view of the mandrel employing the jaw arrangement of FIG. 5;

FIG. 8 represents a sectional view of a short expanding mandrel or core chuck and showing yet another means for retaining the three outer jaws;

FIG. 9 represents an end view of the chuck of FIG. 8, this view taken on the line 9—9 thereof and looking in the direction of the arrows, and FIG. 10 represents a slightly enlarged fragmentary sectional view as in FIG. 8 and showing a means for leading the inlet end of the spiral tubing to an outer face of the end member of the core chuck.

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose details of construction for the purpose of explanation of the invention, but it should be understood that the invention may be incorporated in other structural forms than shown.

DESCRIPTION OF THE PREFERRED EMBODIMENT

The present embodiment is contemplated to illustrate the general principles of the expansible chuck or mandrel of U.S. Pat. No. 3,825,167 in which a resilient helical wound tube is pneumatically or hydraulically actuated. As in this reference patent the embodiment shown has a body member generally indicated as 20 in which is formed a through bore 22 disposed for mounting upon a shaft which, when required, is used with the machine which feeds and winds or unwinds the material being processed. The outer surface of this body 20 has its intermediate portion formed with a helical or thread-like groove 24 which is shaped to provide a smooth troughway. The groove is spaced so that between convolutions a very small or narrow wall portion 26 is provided between adjacent grooves 24. The two ends of this helical groove are terminated with short straight portions. In these straight end portions and in the intermediate spiral grooved portion is mounted and retained a rubber tube member 30. This groove and mounted tube are particularly shown in FIG. 1 and in greater detail in the reference patent. The tubing 30, when mounted in the groove 24, is a snug fit in the groove and with a plurality of retained movable jaw members 32 placed on top of the tubing the tube in an unpressurized condition is in a more-or-less partially flattened condition as depicted in FIG. 3. The tubing is retained in a desired helical or spiral spacing by means of the shoulder wall or walls 26. When air or hydraulic pressure is fed into the tubing 30, the tubing is locally expanded where permitted to push jaw members 32 outwardly to a determined limit. When the movable jaws engage the core of the member which they are to support and drive, the jaws 32, of course, are stopped against further movement. This outward movement is best seen in the right half portion of FIG. 4 wherein as in the reference patent the groove 24 retains a large portion of the tubing.

As seen in FIGS. 2 and 3, the body member 20 is shown with a supporting bore 22 for mounting on a shaft, not shown. The right end of the body 20 is carried by an end member 33 whose outer diameter is at least a sliding or loose fit for the member with which the expanding mandrel is to be used. A head end member 34 (left end) carries the other end of body 20 and has its outer diameter substantially greater than end 33. Movable jaws 32 are retained against torque forces by pins 36. These jaws slide in and outwardly on pins 36.

Garter springs 38 are carried in circumferential grooves 39 formed in the outer surfaces of the jaws 32 and urge the jaws inwardly to and toward body member 20.

The rubber tubing 30 has its intake end mounted in the left end of body 20 as seen in FIG. 1. From the inlet end, the tube 30 extends rightwardly in helical groove 24. This inlet construction, as more fully described in the reference patent, has the inlet end of the tube 30 slid over a tapered plug 42 which has a through bore. This mounted end of the rubber tubing 30 is secured on this hollow tapered plug by sleeve means or the like. An internally threaded member 44 is retained in a larger bore 46 formed in the end of the body 20 and by means of a set screw 48 is secured in this larger bore 46. The threaded inner portion of plug 42 is threaded for mounting therein of a valve core in the manner of a valve core removably mounted in a stem of an automobile tire wheel or inner tube. Through this valve, air or other fluid may be fed into the rubber tube 30 and released from the tube by causing the valve to be opened or unscrewed.

Jaw Construction as in FIGS. 3 and 4

Referring next to the particular embodiment of the jaw members depicted in FIGS. 3 and 4, there is shown mounted on body 20 three movable jaws 32 which provide the entire circumference of the mandrel. Although very small mandrels may use as few as two like jaws and very large mandrels use more than three jaws, the general size ranges employ three like jaws usually of extruded aluminum. From longer lengths the jaw members are cut to a length to be retained between ends 33 and 34. In this embodiment one longitudinal edge of jaw is formed with an inner leaf 50 which may be about one-half the total thickness of the jaw. The opposite or other longitudinal edge is formed with an outer overlaying leaf portion 52. In the nonexpanded condition there may be as little as one-sixteenth of an inch from facing edge of the leaf members while the overlapping surfaces are in engagement.

Outward and inner movement of the jaws 32 is limited to a radially controlled direction as guided by body pins 36 whose inner ends are fixedly mounted in body member 20. Holes 54 formed in jaws 32 are sized to freely slide on pins 36. In its maximum expanded condition, as seen in the right half of FIG. 4, leaf portion 52 is still supported by a portion of underleaf portion 50 of the adjacent jaw. To insure that excessive expansion does not accidently occur a limit pin 56 having its inner end secured in a hole in leaf 50 is slidable in a slot 58 formed in outer leaf 52. Pin 56 limits the outward movement of jaw 32 to the circumference of the three jaws when the pin 56 is in engagement with the end of the slot adjacent the end wall of leaf 52.

Use and Operation of the Mandrel Using the Jaws of FIGS. 3 and 4

A typical core of a spool or reel is slid onto the nonexpanded mandrel and conventionally to the shoulder provided by the end 34. Air is fed in through member 44 and into tube 30 which expands to move the jaws 32 outwardly into driving engagement with the core of the spool or reel. The expanded mandrel is then rotated in the conventional manner. The aluminum jaws bend from their initial curve to assume the larger diameter of the core. The amount of bending is well short of the elastic limit of the metal. When the spool or reel is to be removed from the mandrel, the pressurized air is released allowing tube 30 to collapse. Springs 38 draw the jaws 32 inwardly toward and to their smallest diameter. The torque load of driving the spool or reel is transmitted from the jaws 32 to the body pins 36. Two or more pins 36 are used to retain each jaw in aligned position on the body.

In the event that the core of the spool or reel is larger than the selected expansion limit of the mandrel, usually one-eighth to one-quarter inch, the limit pin 56 and the cooperating slots 58, as shown in FIG. 6, prevent moving the jaws outwardly beyond the ends of body pins 36. Actually the preferred outward limit of travel of the jaws is about one-eighth of an inch which is about one-half the extending length of the pin 36 from body 20.

Alternate Jaw Arrangement of FIGS. 5 and 7

Referring next to FIGS. 5 and 7, there is depicted an alternate jaw construction to that of FIGS. 4 and 6, above-described. In this alternate embodiment, instead of the outer expansion limit provided by pins 56 and slots 58, interferring stop ribs or shoulders are provided. As particularly shown in FIG. 5, this mandrel has an edge formed with an inner leaf portion 60 extending in a counterclockwise direction. This leaf is integrally formed as a part of jaw 62. An outwardly extending stop rib portion 64 is also an integral portion of the leaf and is made near the distal end of leaf 60. The other edge of the jaw is formed with an outer leaf 66 extending in a clockwise direction. This distal edge is formed with an inwardly directed stop rib 68. As in FIG. 1, a plurality of garter springs 38 may be provided to draw the jaws 62 into seated engagement with body member 20. In the nonexpanded condition the stop ribs 64 and 68 are a selected distance from each other. In the normally expanded condition the outer surfaces of the jaws engage the core of the reel or spool and the stop ribs 64 and 68 approach but do not engage each other. Maximum expansion of the mandrel is achieved when ribs 64 and 68 are brought into longitudinal edgewise engagement which limits the outer movement of the jaws on body pins 36. As an extrusion, the jaw 62 and ribs 64 and 68 are made in lengths usually much longer than the mandrel with which they are associated. As reduced to practice, only one extrusion is required for each like jaw with three jaws of like cross section used with each mandrel. In the fully expanded condition the jaws 64 and 68 snugly engage each other as seen in the right-hand view of FIG. 5. Pins 36 transmit and receive all the torque loads from the jaws 62 to the body member 20. The ends 33 and 34 are the ends used with the body member 20 and on which the jaws 62 are mounted and retained.

Short Chuck of FIGS. 8, 9 and 10

Referring next and finally to FIGS. 8, 9 and 10 there is shown yet another chuck or mandrel which also has its driving periphery formed of adjacent jaws. In this embodiment the chuck is preferably used with short spools or reels having core diameters of five to ten inches. The driving surface of the mandrel preferably comprises three or more like jaws 80. End plates 82 having an outer diameter which corresponds to the inner curve of the jaws 80 have a bore 84 made to suit the drive spindle of the power driven winding or unwinding apparatus.

A body member 120 like body member 20 has a helical groove 24 in which is mounted a rubber tube 30, as above described. The end plates are retained in spaced array by means of three or more longitudinal rods or pins 86 snugly fitted in appropriately formed holes in the plates 82. Clearance holes 88 are formed in body member 120 for the mounting therethrough of rods 86. Locking dowels 90 are tightly mounted in an aligned hole formed in both end plate 82 and rod 86. Each end of rod 86 is secured to the associated end plate in this manner.

Torque is transmitted to and from jaws 80 to end plates 82 by means of body pins 94 tightly fitted in an appropriately formed hole in end plate 82. A locking dowel 96 is tightly fitted in a longitudinally disposed hole in both end plate 82 and body pin 94. At the drive end the body pins may extend a determined distance beyond the periphery of the jaws 80 when in a nonexpanded condition. This extension provides a shoulder stop for establishing a desired mounting condition of the reel or spool on the chuck.

A stop dowel 98 is secured in body pin 94. A longitudinal relief slot 100 is formed in each end of jaw 80. This slot is wider than dowel 98 which slides freely in this slot. A radially disposed hole 102 is also formed in each end of the jaw. This hole is a sliding fit with the diameter of body pin 94. The left end of the chuck, as seen in FIG. 8, has shorter body pins 194 which operate as do the body pins 94 except that they do not extend beyond the outer diameter of the jaws 80 when this chuck is in its nonexpanded condition.

A drive end collar 110 may be mounted to the right end plate 82 by cap screws 112. An inlet 114 is formed in this collar to accommodate air connecting means as above-described. A tube carrying conductive passageway 116 is formed in end plate 82 as in FIG. 10. This passageway enables the inlet end of tube 30 to be brought from inlet 114 to the spiral groove 24.

Use and Operation of the Chuck of FIGS. 8-10

As in the prior described embodiments the driving periphery of the chuck is occupied by the jaws 80. As this chuck has jaws which conventionally are of eight inches or less there are usually no garter springs used to draw the jaws to the body but this is not to preclude their use. The chuck in the nonexpanded condition has lower jaw or jaws hanging from the stop dowels 98 while the upper jaw or jaws rest on the end plate 82. The spool or reel is slid onto the jaws 80 of the unexpanded chuck until the body pins 94 are reached. Pressurized air is then fed to the tube 30 which causes the jaws 80 to move outwardly on pins 94 and 194. Outward travel of the jaws is terminated when the inner diameter of the core is firmly engaged or stop dowels 98 are engaged by the bottom surface of slot 100.

Torque is transmitted to and from jaws 80 to end plates 82 by means of body pins 94. As in the embodiments of FIGS. 4 and 5, the tube 30 in the chuck of FIG. 8 neither receives or transmits torque from or to the jaws. A positive outward limit to the movement of the jaws is provided. This prevents a blowout of tube 30 and/or accidental disengagement of the jaws from end plates 82. Jaws 80 bend slightly under the pressure of expanded tube 30 to assume the contour of the spool or reel mounted thereon.

Terms such as "left," "right," "up," "down," "bottom," "top," "front," "back," "in," "out," "clockwise," "counterclockwise" and the like are applicable to the embodiments shown and described in conjunction with the drawings. These terms are merely for the purposes of description and do not necessarily apply to the position in which the expanding mandrels or chucks may be constructed or used.

While particular embodiments of these mandrels and/or chucks have been shown and described it is to be understood modifications may be made within the scope of the accompanying claims and protection is sought to the broadest extent the prior art allows.

What is claimed is:

1. An expanding mandrel in which the expanding member is actuated by air and the like, the expanding unit characterized as having a body member having its outer periphery formed with a helical groove in which is mounted a resilient tube with one end of the tube connected to means for feeding external air to said end of the tube and with the other end of the tube closed by means providing external air to said end of the tube and with the other end of the tube closed by means providing a fluid-tight seal, said expansible mandrel including: (a) a body member having an outer determined periphery in which is formed a helical groove of relatively constant width and depth; (b) a resilient tube carried and mounted in said groove, said tube in a nonexpanded and mounted condition having its outwardly facing surface disposed to lay substantially at the periphery of the body; (c) a plurality of longitudinally disposed movable jaw members carried by and on the intermediate portion of the body and providing all of the driving and support surface for a core of a reel, spool and the like, the underside of the movable jaw members in local contact with portions of the top surface of the resilient tube after the tube has been mounted in the helical groove, the movable members formed and positioned to engage and retain the outer surfaces of the mounted resilient tubing; (d) retaining and guide means carried by the body and slidably engaging the longitudinally disposed movable jaw members so as to cooperatively limit the outward movement of said movable jaw members while at the same time transmitting the developed torque forces to and from the movable jaw members to the body members, and (e) a fluid conductive and connecting means cooperatively associated with the inlet end of the resilient tube, said conductive means permitting selective filling and discharge of pressurized air, fluid and the like to the helically arranged resilient tube to cause responsive outward and permit inward movement of the movable jaw members.

2. An expanding mandrel as in claim 1 in which the retaining and guide means includes body pins fixedly secured to the body and arranged so that each movable jaw member is slidably mounted on at least two pins with said member radially movable outwardly and inwardly.

3. An expanding mandrel as in claim 2 in which the means for limiting the outward movement of the movable jaw member is stop dowels secured in and carried by the body pins.

4. An expanding mandrel as in claim 2 in which the means for limiting the outward movement of the movable jaw member are cooperatively associated stop pins carried by a leaf edge portion of one movable jaw member and a slot in a leaf edge of an adjacent movable jaw member, the stop pin disposed in and slidable in the slot until it reaches one end thereof.

5. An expanding mandrel as in claim 2 in which the means for limiting the outward movement of the movable jaw member is an outwardly directed member longitudinally disposed on an inner leaf edge portion of the jaw, this leaf edge portion overlapped by an outer leaf edge formed on the other longitudinal edge of an adjacent jaw, this outer leaf edge having a cooperatively disposed inwardly directed rib member which engages the facing edge of the outwardly directed rib member of the inner leaf to limit the outward movement of the movable jaw.

6. An expanding mandrel as in claim 1 in which there is provided at least one expansible tension band member carried in a circumferential groove formed in the outer surfaces of the jaw members, this tension band disposed to draw the jaw members to the body surface when the pressure in the tube has been reduced to substantially atmospheric pressure.

7. An expanding mandrel as in claim 2 in which body pins are secured to the body member, said body pins arranged so as to pass through correspondingly formed apertures formed in the ends of the radially outwardly movable jaws, said jaws also having short slots formed in the end portions whereat the body pins pass through the jaws and further including a limit pin securely mounted in a transversely disposed hole formed in each body pin, the slots in the jaws providing passageways for the free movement therein of the limit pin mounted in the transversely disposed hole formed in the body pin.

8. An expanding mandrel as in claim 7 in which the mandrel is of a short length with the movable jaws forming all of its larger outer diameter and in which a shoulder stop to limit the longitudinal mounting of a spool on the mandrel is provided by extending the length of the body pins so that when the jaws are in their maximum expanded position the ends of these body pins extend outwardly a short distance from the outer surface of the expanded jaws.

* * * * *